United States Patent [19]
Nye

[11] Patent Number: 5,242,628
[45] Date of Patent: Sep. 7, 1993

[54] DISTILLATION TRAY/DOWNCOMER

[75] Inventor: James O. Nye, Friendswood, Tex.

[73] Assignee: Nye Trays, Inc., Friendswood, Tex.

[21] Appl. No.: 968,578

[22] Filed: Oct. 29, 1992

[51] Int. Cl.⁵ ............................................. B01F 3/04
[52] U.S. Cl. ............................................. 261/114.1
[58] Field of Search ................................... 261/114.1

[56] References Cited

U.S. PATENT DOCUMENTS

| | | | |
|---|---|---|---|
| 2,681,219 | 6/1954 | Thrift et al. | 261/114.1 |
| 3,464,679 | 9/1969 | Becker | 261/114.1 |
| 4,374,000 | 2/1983 | Abernathy et al. | 261/114.1 |
| 5,047,179 | 9/1991 | Nye | 261/114.1 |
| 5,049,319 | 9/1991 | Nye | 261/114.1 |
| 5,164,125 | 11/1992 | Binkley et al. | 261/114.1 |

FOREIGN PATENT DOCUMENTS 60-147234  8/1985  Japan ................... 261/114.1

*Primary Examiner*—Tim Miles
*Attorney, Agent, or Firm*—Kenneth H. Johnson

[57] ABSTRACT

An improvement in the downcomer portion of a distillation column having the seal pan of the downcomer positioned above the adjacent lower tray and below the apron of the downcomer and having a first perforated plate extending down from the bottom of the downcomer to the lower adjacent tray wherein the improvement comprises an extension of the downcomer apron along a radius centered in said downcomer through an angle of greater than 0 to less than 180° to form an extension extending into the downcomer to prevent vapor from entering the downcomer because of misalignment during installation, reduce the exit gap from the downcomer and to allow additional vapor perforations.

15 Claims, 2 Drawing Sheets

DISTILLATION TRAY/DOWNCOMER

BACKGROUND OF THE INVENTION

Field of the Invention

The present invention relates to an improved distillation column, particularly an improved tray downcomer assembly.

Related Art

In the ordinary operation of a tray on a distillation column the liquids flow downwardly while the gases flow upwardly. In a distillation column there are usually a plurality of plates or trays. The trays have some means of allowing vapor to flow upwardly, e.g., plurality of openings while flowing the liquid in contact with the upflowing vapors on the tray. When the liquid contacts the vapor on each tray, and mass transfer occurs, the lighter constituent(s) concentrate in the overheads of the tower, and the heavier constituent(s) concentrate in the lower part of the tower. The liquid moves downward from tray to tray, generally by means of downcomers.

Early downcomers are illustrated by U.S. Pat. Nos. 2,565,355; 2,582,657; 2,582,826; 2,699,929; 2,714,504 and 3,573,172, wherein each downcomer is of substantially uniform cross section. There is entrained vapor in the liquid entering the downcomers, and therefore a disengagement of vapor from the liquid in the downcomer is going to occur with a specific area of the downcomer being required to achieve this, to prevent a prematurely "flooded tower" arising. Likewise there are entrained droplets of liquid in the vapor rising from the tray. If the upward velocity of the vapor is sufficiently low, these droplets will fall back to join the liquid on the tray from whence they came. As the upward vapor velocity increases, more and more droplets are entrained to the tray above. This liquid must then flow back through the downcomer. When the vapor velocity reaches the point that more liquid is entrained upward than the downcomer can handle, flooding occurs. Thus, in the design of a tower there is a competing factor to consider, which is the active area of the tray. The effective active area is mathematically defined as the cross-sectional area through which the upward flowing vapor passes. The upward velocity of the vapor is the volume of vapor divided by the effective active area of the tower.

The vapor handling capacity of the tower is generally proportional to the active area of the tray(s). It was found that in the downcomers that the disengagement of the vapors and liquid may be accomplished by enlarging the area of the upper portion of the downcomer and reducing the area of the lower portion of the downcomer. This in effect increased the area of the tray(s), and is illustrated for example in U.S. Pat. Nos. 2,420,075; 2,491,726; 2,591,343; 2,596,249; and 4,174,363. Hence, the improvement pursued has been to maintain the required area in the downcomer for vapor disengagement while increasing the effective active area of the tray(s).

In U.S. Pat. Nos. 5,047,179 and 5,049,319 to Nye, there is disclosed an improved distillation column downcomer, in which the seal pan of the downcomer is spaced above the adjacent lower tray and connected to the tray by a perforated plate, whereby the effective active tray are is increased (by placing that portion of the tray normally occupied by the downcomer seal pan back into use as a portion of the tray through which vapor may pass for contact with the liquid on the tray—the contact being made by the vapor passing through the perforated plate connecting the seal pan and the tray), which thereby increases the throughput capacity of a given distillation tower. A second perforated plate is generally used to replace the former seal pan.

The Nye tray increases the effective active tray area in the column. This is achieved without loss of any of the useful downcomer volume. Actual testing showed that the improved throughput of the column was directly proportional to the increase in effective active area. This simple expedient has shown up to a 20% increase in throughput over the same column using prior art type of downcomers.

Basically the upward moving vapors can pass through the second perforated plate, if any, and then through the first perforated plate in the same manner as they do through the tray, hence in effect the first perforated plate which extends between the tray and the seal pan serves or at least functions as additional tray surface. Similarly, the second perforated plate, which may be positioned where the seal pan was formerly positioned, may also be considered to represent an addition to the tray surface. It is preferred that the first perforated plate is inclined at least in part, and that is, it extends away from the bottom of the downcomer. This gives a slightly greater surface and also facilitates the vapor passage and contact with the liquid. The Nye trays and downcomers assemblies have enjoyed a wide commercial success.

It has been found that distillation towers may be out of round a sufficient amount to distort the necessary relationship of the perforated plate and the apron of the downcomer, to allow some of the rising vapors in the column to enter the downcomer.

It is an advantage of the present invention that upward flowing vapor is excluded from the downcomer even if there are tower irregularities. It is a further advantage that higher turndown may be obtained and additional effective tray area. These and other advantages and features will be apparent from the following description.

SUMMARY OF THE INVENTION

An initial solution to foreclose this problem was a single bend of greater than 0° to 150°, preferably up to 135°, as for example 45° to form a lip on the lower edge of the downcomer apron into the downcomer. The lip provides a deflection surface for the rising column vapors.

More particularly the present invention is an improvement in the downcomer portion of a distillation column having the seal pan of the downcomer positioned above the adjacent lower tray and below the apron of the downcomer and having a first perforated plate extending down from the seal pan to the lower adjacent tray wherein the improvement comprises the extension of the apron along a radius centered in said downcomer through an angle of greater than 0° to less than 180°, preferably about 60° to 120°. The radius is preferably equal to 10–20% of the downcomer bottom width. The substantially arcuate extension of the present invention provides a lower pressure drop through the gap between the downcomer apron and the seal pan than an equivalent angular bend. This allows the use of a smaller gap between the apron and seal pan and provides an improvement in the turndown capacity of the tower. The term "turndown capacity" as used herein means the percentage below design capacity at which the tower can still be operated. A higher turndown capacity represents greater flexibility in the tower operation.

The apron in the present configuration extends into the downcomer.

A further improvement resulting from the extension of the downcomer apron, allows the addition of perforations to the seal pan below the apron extension. Thus, more of the tray surface lost to the seal pan is recovered.

DETAILED DESCRIPTION AND PREFERRED EMBODIMENTS

Figure 1:
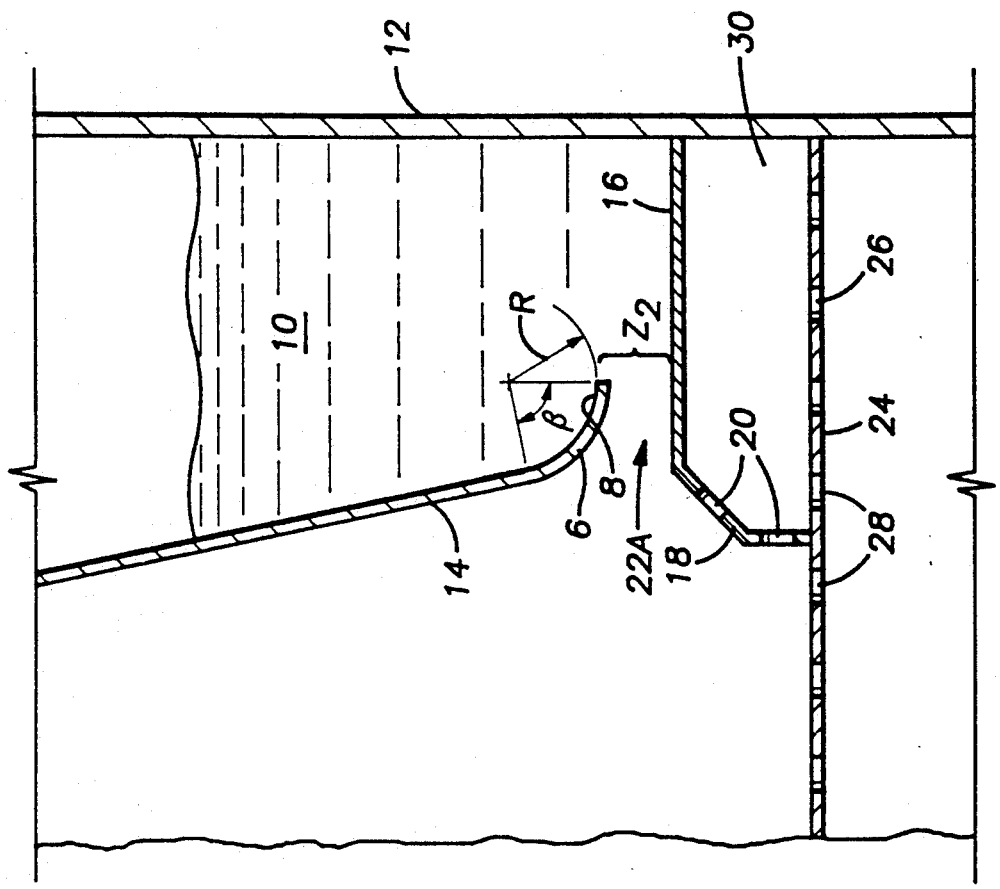
FIG. 1 is a schematic representation of a partial cross sectional view of a distillation column side mounted downcomer and seal pan having a 45° lip on the downcomer apron.

In the drawings the same or substantially same elements have been given the same indicia.

In FIG. 1 the schematic represents a partial section of a distillation column showing one tray 24 with wall 12. Each downcomer apron 14 is formed of a plate, i.e., preferably an inclined plate.

The area at the bottom of the downcomer is generally 50 to 70% of the area at the top of the downcomer.

Depending directly from seal pan 16 and sealed thereto is the perforated plate 18, which extends downward and along the seal pan. Preferably the perforated plate 18 is inclined or at least have a portion thereof which is inclined.

The bottom member 26 has perforations over a portion and is effectively an extension of tray 24. In this schematic representation the tray and the bottom are depicted as a single member. A detailed description of the ancillary structure associated with the present downcomers is contained in U.S. Pat. Nos. 5,047,179 and 5,049,319 which are incorporated herein.

The vapor passes up through openings 28 into the chamber 30 then exit through the openings 20 in perforated plate 18. The seal pan seats against wall 12 and forms a tight seal. The liquid in the downcomer passes through gap 22 between the tip 8 of apron 14 and seal pan 16 over perforated plate 18 onto tray 24.

The gap 22 is determined by the flow rates in the column, in the same manner as for conventional arrangements. Since the downcomers will generally be sloped, the actual downcomer bottom width will increase as the clearance increases. In FIG. 1 gap 22 has a height Z. The lower portion 4 of apron 14 is bent inward into the downcomer at angle α, which is about 45° to form a lip. This allows for some distortion of the downcomer assembly, because of tower idiosyncracies, which would otherwise result in misalignment of the tip 8 and the perforations 20 and allow vapor into the downcomer.

Figure 2:
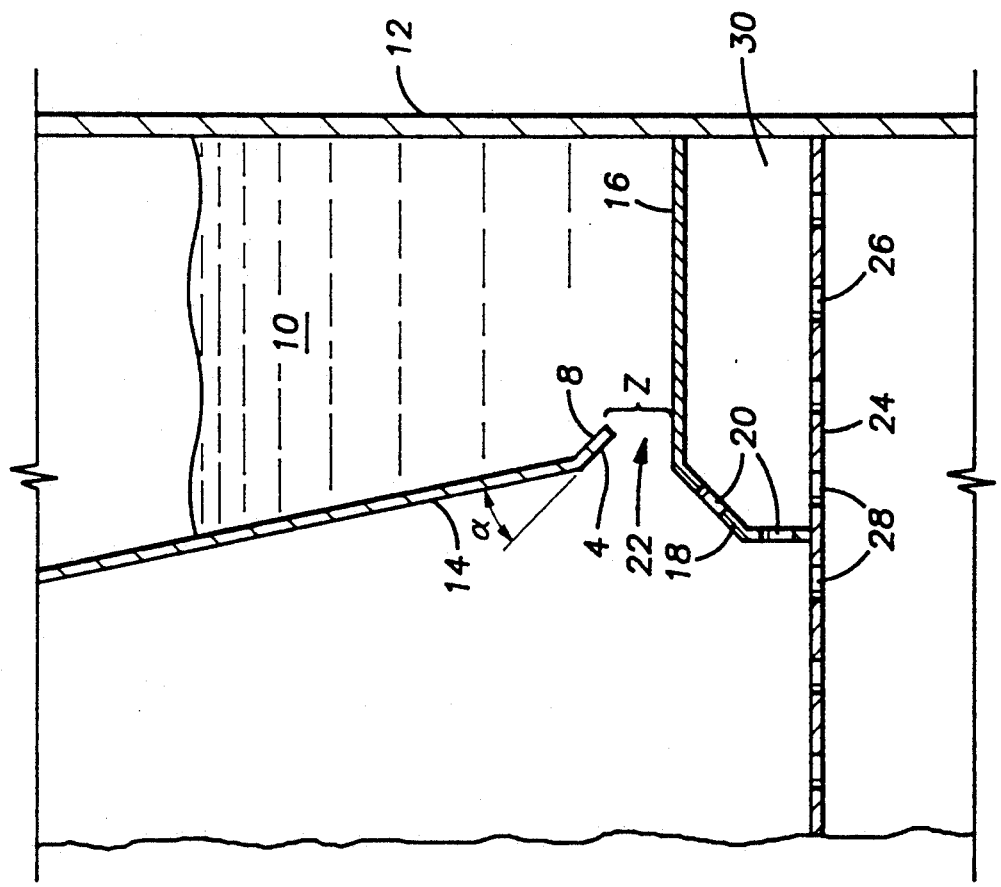
FIG. 2 is a schematic representation of a partial cross sectional view of a distillation column side mounted downcomer and seal pan having a substantially arcuate extension on the downcomer apron.

In FIG. 2 the extension 6 of apron 14 is bent inward on a radius r (although the actual bend may be incremental segments, approaching an arcuate shape) along an arc of angle β. The length of the radius and the angle of the curve determine the gap 22A remaining after the extension. Preferably the gap is as small as possible without resulting in flooding under the designated flow conditions of the tower. The gap 22A has height $Z_2$, which is smaller than Z, but because of the substantially arcuate shape of the extension 6 has the same or lower pressure drop than the angled bend of FIG. 1. The smaller gap 22A, allows for a higher turndown and hence a more flexible unit.

Figure 3:
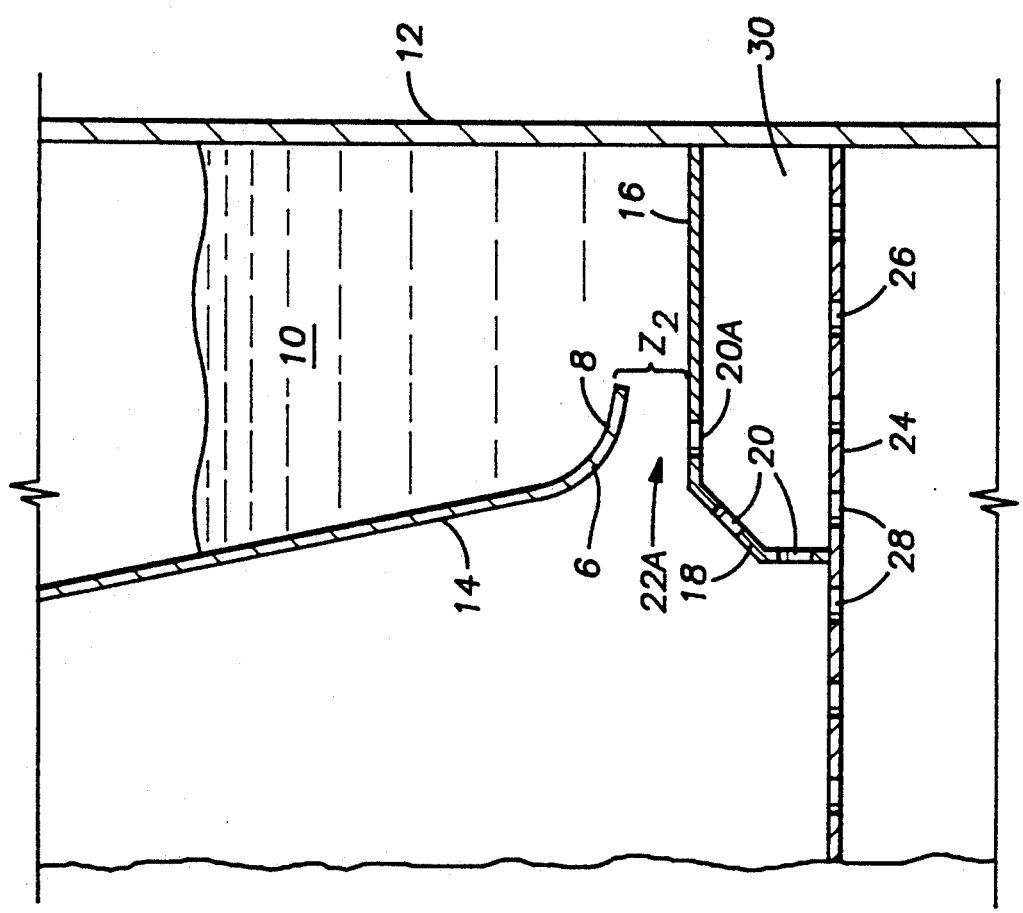
FIG. 3 is a schematic representation of a partial cross sectional view of a distillation column side mounted downcomer and seal pan having a substantially arcuate extension on the downcomer apron and perforations on the seal pan.

FIG. 3 is the same as FIG. 2 except that additional perforations 20A have been made on the pan 16 in the area adjacent to the extension 6, but outside the tip 8. Depending on the number of additional perforations, this can increase the throughput in the column several percentage points beyond the benefits obtained with the basic novel downcomer arrangement.

The invention claimed is:

1. A downcomer for use in a distillation column comprising:
    (a) A generally downward extending inclined plate, which describes at least one surface enclosing a space having a downwardly decreasing volume, said inclined plate being positioned along a seal pan and spaced slightly thereabove and having a substantially arcuate extension adjacent to said seal pan along a radius centered in said downcomer through an angle of greater than 0 to less than 180°, and
    (b) a generally downward extending perforated plate extending along and below said seal pan.

2. The downcomer according to claim 1 wherein said perforated plate at least partially is inclined away from said seal pan.

3. The downcomer according to claim 1 wherein the inclined plate extends into the downcomer.

4. The downcomer according to claim 1 wherein said seal pan comprises perforations thereon adjacent to said extension.

5. The downcomer according to claim 1 wherein the radius is equal to 10-20% of the downcomer bottom width.

6. The downcomer according to claim 1 wherein said angle is from about 60 to 120°.

7. The downcomer according to claim 6 wherein the inclined plate ends at or before a point having a minimum distance from said seal pan for said radius.

8. The downcomer according to claim 6 wherein inclined plate ends at about a point having a minimum distance from said seal pan for said radius.

9. In a downcomer of a distillation column comprising an apron, a seal pan of the downcomer positioned above an adjacent lower tray and below the apron, a first perforated plate extending down from the seal pan to a lower adjacent tray wherein the improvement comprises a substantially arcuate extension of the apron along a radius centered in said downcomer through an angle of greater than 0 to less than 180°.

10. The downcomer according to claim 9 wherein said angle is from about 60 to 120°.

11. The downcomer according to claim 9 wherein the apron extends into the downcomer.

12. The downcomer according to claim 9 wherein said seal pan comprises perforations thereon adjacent to said extension.

13. The downcomer according to claim 9 wherein the radius is equal to 10-20% of the downcomer bottom width.

14. The downcomer according to claim 9 wherein the apron ends at or before a point having a minimum distance from said seal pan for said radius.

15. The downcomer according to claim 14 wherein the apron ends at about a point having a minimum distance from said seal pan for said radius.

* * * * *